US010853257B1

(12) United States Patent
Yu et al.

(10) Patent No.: US 10,853,257 B1
(45) Date of Patent: Dec. 1, 2020

(54) ZERO DETECTION WITHIN SUB-TRACK COMPRESSION DOMAINS

(71) Applicant: EMC Corporation, Hopkinton, MA (US)

(72) Inventors: Rong Yu, West Roxbury, MA (US); Jeremy J. O'Hare, Westborough, MA (US); Anoop Raghunathan, Ashland, MA (US); Ning Wu, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 382 days.

(21) Appl. No.: 15/192,212

(22) Filed: Jun. 24, 2016

(51) Int. Cl.
G06F 12/0893 (2016.01)
G06F 3/06 (2006.01)

(52) U.S. Cl.
CPC ........ *G06F 12/0893* (2013.01); *G06F 3/0619* (2013.01); *G06F 3/0631* (2013.01); *G06F 3/0683* (2013.01); *G06F 2212/6042* (2013.01)

(58) Field of Classification Search
CPC .............. G06F 3/0641; G06F 11/1453; G06F 17/3015; G06F 17/30156; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88;

(Continued)

(56) References Cited

U.S. PATENT DOCUMENTS 6,310,563 B1 * 10/2001 Har ..................... H03M 7/3086
341/50
8,631,052 B1 * 1/2014 Shilane ............... G06F 16/1748
707/825

(Continued)

FOREIGN PATENT DOCUMENTS

WO WO-2017096532 A1 * 6/2017 ............. G06F 12/00

OTHER PUBLICATIONS

M. M. Rahmani, A. Al-Mahmud, M. A. Hossen, M. Rahman, M. R. Ahmed and M. F. Sohan, "A Comparative Analysis of Traditional and Modern Data Compression Schemes for Large Multi-Dimensional Extendible Array," 2019 International Conference on Electrical, Computer and Communication Engineering, pp. 1-5 (Year: 2019).*

(Continued)

*Primary Examiner* — Daniel C. Chappell
(74) *Attorney, Agent, or Firm* — Anderson Gorecki LLP

(57) ABSTRACT

Allocation of physical storage capacity within a storage array may be managed in standard size allocation units, e.g. 128 kb tracks, and smaller sub-allocation units, e.g. 32 kb quarter tracks. Data associated with sub-allocation units that match a known pattern may be represented by a hint rather than data in storage. The hint may be used to mitigate overhead associated with accessing backend storage. The hint may also mitigate the need for performing compression/decompression of the corresponding sub-allocation unit if the data is compressed. In response to a read or write request associated with an allocation unit organized into sub-allocation units, only those sub-allocation units that are required to service the read or write request and fail to match a pattern are accessed, decompressed or compressed.

20 Claims, 7 Drawing Sheets

(58) Field of Classification Search
CPC ...... G06F 2003/0691–0698; G06F 2009/3883;
G06F 2009/45562–45595; G06F
2015/761–768; G06F 2201/00–885; G06F
2206/00–20; G06F 2209/00–549; G06F
2211/00–902; G06F 2212/00–7211; G06F
2213/00–4004; G06F 2216/00–17; G06F
2221/00–2153
See application file for complete search history.

(56) References Cited

U.S. PATENT DOCUMENTS

| | | | | |
|---|---|---|---|---|
| 8,972,805 | B2* | 3/2015 | Takefman | G06F 3/0619 714/701 |
| 9,256,610 | B2* | 2/2016 | Tosaka | G06F 16/162 |
| 9,727,244 | B2* | 8/2017 | Camp | G06F 3/0631 |
| 9,959,049 | B1* | 5/2018 | Armangau | G06F 3/067 |
| 10,146,436 | B1* | 12/2018 | Natanzon | G06F 3/0608 |
| 10,459,642 | B2* | 10/2019 | Wang | G06F 3/0619 |
| 10,514,861 | B1* | 12/2019 | Basov | G06F 3/0653 |
| 10,572,340 | B2* | 2/2020 | Zhou | G06F 11/1068 |
| 10,628,063 | B2* | 4/2020 | Breslow | G06F 12/023 |
| 2010/0077141 | A1* | 3/2010 | Achler | H03M 7/30 711/108 |
| 2010/0299491 | A1* | 11/2010 | Ueda | G06F 3/0613 711/162 |
| 2013/0268496 | A1* | 10/2013 | Baldwin | G06F 17/30156 707/692 |
| 2016/0291877 | A1* | 10/2016 | Higuchi | G06F 3/0641 |

OTHER PUBLICATIONS

Bo Mao, Hong Jiang, Suzhen Wu, Yinjin Fu, and Lei Tian. 2014. Read-Performance Optimization for Deduplication-Based Storage Systems in the Cloud. ACM Trans. Storage> 10, 2, Article 6 (Mar. 2014), 22 pages. (Year: 2014).*

Saso Tomazic, Vesna Pavlovic, Jasna Milovanovic, Jaka Sodnik, Anton Kos, Sara Stancin, and Veljko Milutinovic. 2011. Fast file existence checking in archiving systems. ACM Trans. Storage 7, 1, Article 2 (Jun. 2011), 21 pages. (Year: 2011).*

* cited by examiner

US 10,853,257 B1

ZERO DETECTION WITHIN SUB-TRACK COMPRESSION DOMAINS

BACKGROUND

The subject matter of this disclosure is generally related to data storage systems that may be used to maintain large data sets and support multiple host applications and concurrent users. A data storage system may include multiple storage arrays. Each storage array may include multiple computing nodes that manage access to tangible data storage devices. Each storage array presents one or more logical production volumes of storage to host applications running on a host device. The host applications may access the production volumes by sending IOs to the storage arrays. The computing nodes maintain an abstraction layer between the production volumes and the tangible data storage devices.

SUMMARY

All examples, aspects and features mentioned in this document can be combined in any technically possible way.

In accordance with an aspect an apparatus comprises: a storage array comprising: a plurality of tangible data storage devices; and a computing node comprising a processor and a cache, wherein the computing node presents a production volume to a host application, the production volume being backed by the tangible data storage devices, and wherein the computing node: causes an allocation unit of production volume data to be stored on the tangible data storage devices; reorganizes the allocation unit into a plurality of sub-allocation units; determines that a first sub-allocation unit of the plurality of sub-allocation units matches a known pattern; represents the first sub-allocation unit with a first pattern identifier; determines that a second sub-allocation unit of the plurality of sub-allocation units does not match the known pattern; and causes the second sub-allocation unit to be stored on the tangible data storage devices. In some implementations a hint field is associated with the allocation unit, the hint field comprising a first location hint indicative of location of the second sub-allocation unit on the tangible storage devices. In some implementations the hint field further comprises the first pattern identifier. In some implementations the computing node, in response to a request to read the first sub-allocation unit, uses the first pattern identifier to generate the first sub-allocation unit in the cache. In some implementations the first pattern identifier is indicative of all 0 values. In some implementations the apparatus comprises a record of a plurality of known patterns, the record being maintained in the cache. In some implementations the computing node, in response to a request to read the first sub-allocation unit, uses the first pattern identifier with the record of known patterns to generate the first sub-allocation unit in the cache. In some implementations the computing node, in response to a request to write to the second sub-allocation unit, determines that the second sub-allocation unit will match one of the known patterns as a result of the write, and represents the second sub-allocation unit with a second pattern identifier. In some implementations the computing node, in response to a request to write to the second sub-allocation unit, determines that the second sub-allocation unit will match the known pattern as a result of the write, and represents the second sub-allocation unit with the first pattern identifier. In some implementations the computing node determines that all of the sub-allocation units are represented by pattern identifiers and, in response, de-allocates space on the tangible storage devices allocated to the allocation unit.

In accordance with an aspect a method comprises: with a storage array comprising a plurality of tangible data storage devices and a computing node comprising a processor and a cache: presenting a production volume to a host application, the production volume being backed by the tangible data storage devices; causing an allocation unit of production volume data to be stored on the tangible data storage devices; reorganizing the allocation unit into a plurality of sub-allocation units; determining that a first sub-allocation unit of the plurality of sub-allocation units matches a known pattern; representing the first sub-allocation unit with a first pattern identifier; determining that a second sub-allocation unit of the plurality of sub-allocation units does not match the known pattern; and causing the second sub-allocation unit to be stored on the tangible data storage devices. In some implementations the method comprises associating a hint field with the allocation unit, the hint field comprising a first location hint indicative of location of the second sub-allocation unit on the tangible storage devices. In some implementations the method comprises adding the first pattern identifier to the hint field. In some implementations the method comprises the computing node, in response to a request to read the first sub-allocation unit, using the first pattern identifier to generate the first sub-allocation unit in the cache. In some implementations the method comprises interpreting the first pattern identifier as indicative of all 0 values. In some implementations the method comprises maintaining a record of a plurality of known patterns, the record being maintained in the cache. In some implementations the method comprises the computing node, in response to a request to read the first sub-allocation unit, using the first pattern identifier with the record of known patterns to generate the first sub-allocation unit in the cache. In some implementations the method comprises the computing node, in response to a request to write to the second sub-allocation unit, determining that the second sub-allocation unit will match one of the known patterns as a result of the write, and representing the second sub-allocation unit with a second pattern identifier. In some implementations the method comprises the computing node, in response to a request to write to the second sub-allocation unit, determining that the second sub-allocation unit will match the known pattern as a result of the write, and representing the second sub-allocation unit with the first pattern identifier. In some implementations the method comprises the computing node determining that all of the sub-allocation units are represented by pattern identifiers and, in response, de-allocating space on the tangible storage devices allocated to the allocation unit.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service. A "production volume" is a logical unit of storage that is presented to the host application. Tangible data storage devices are used to implement the storage service and present the production volume.

Figure 1:
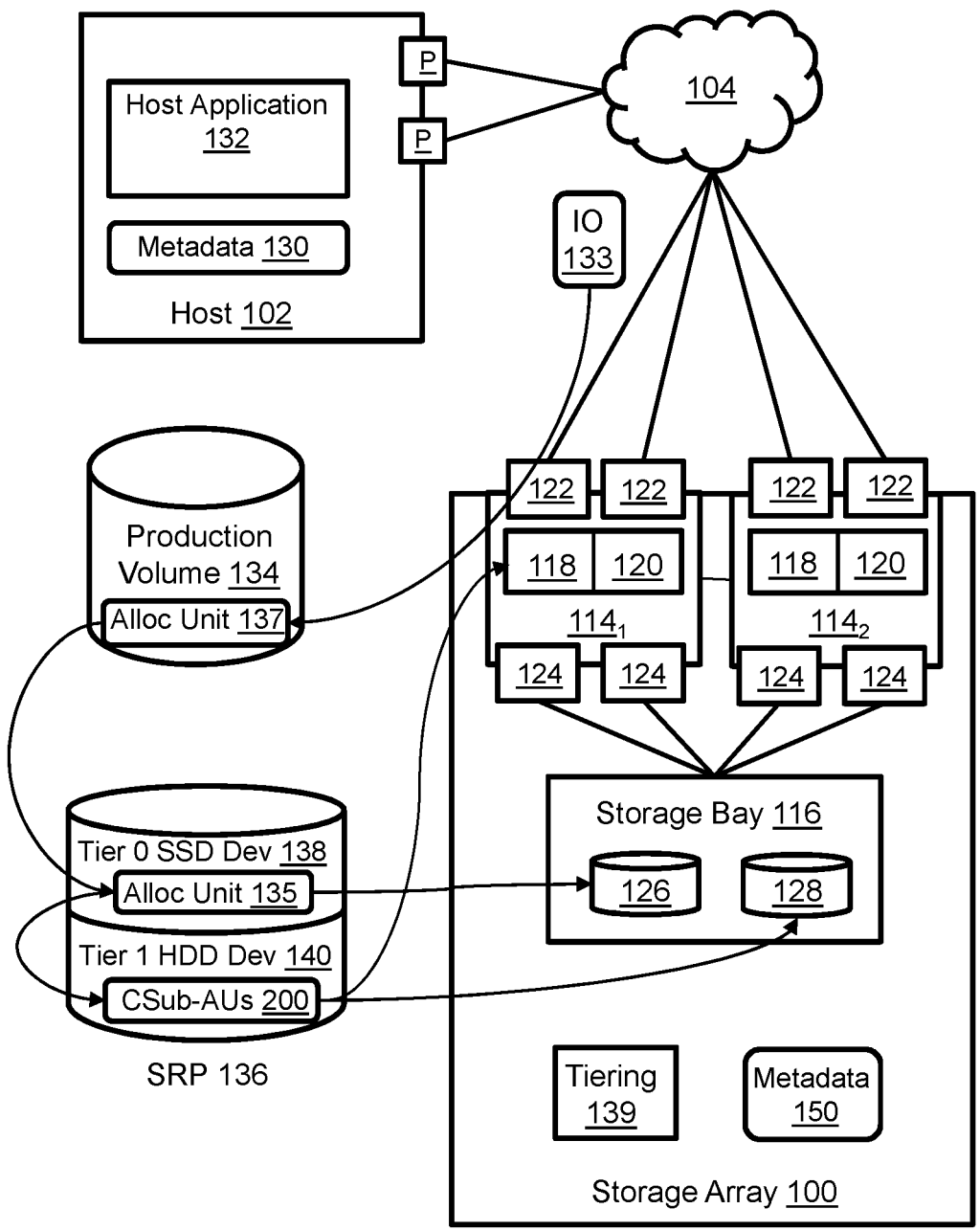
FIG. 1 illustrates a storage array with pattern-aware sub-allocation units.

FIG. 1 illustrates an exemplary data storage system with a data storage array 100 and a host device 102. Any number of host devices and data storage arrays could be included in the data storage system. The host device 102 is connected to the storage array 100 via a network 104. The network 104 may include various types of network nodes, e.g. switches, routers, hubs, and other network devices, and may include one or more of the Internet, a WAN (wide area network), MAN (metropolitan area network), LAN (local area network), and SAN (Storage Area Network).

The storage array 100 includes one or more interconnected computing nodes $114_1$-$114_2$ and a storage bay 116 with groups of tangible storage devices 126, 128. The computing nodes and storage devices may be, but are not necessarily, located in the same geographic location and within the same chassis. The computing nodes $114_1$-$114_2$ may include "vanilla" storage server computers and specialized computer hardware platforms including but not limited to storage directors and storage engines that are specifically designed for use in storage arrays. Each computing node includes at least one multi-core processor 118 and a cache 120. The cache 120 may include, for example and without limitation, volatile memory such as RAM (random access memory) and high performance SSDs (solid state devices). Each computing node may allocate a portion of its respective cache 120 to a shared "global" cache that can be accessed by other computing nodes, e.g. via DMA (direct memory access) or RDMA (remote direct memory access). Each computing node is connected to every other computing node in the storage array via point-to-point links of an interconnecting fabric. The computing nodes may include FAs (front-end adapters) 122 for communicating with the host 102, and DAs (disk adapters) 124 (which may also be referred to as BE (back end) adapters) for communicating with the storage bay 116. The storage bay 116 may include groups of tangible data storage devices of various different technology types, for example and without limitation a group 126 of SSD "flash" drives and a group 128 of HDDs (hard disk drives). The computing nodes $114_1$, $114_2$ maintain at least one logical production volume 134 that is backed by the tangible data storage devices. Without limitation, the production volume may be referred to as a production LUN or host LUN, where LUN (logical unit number) is a number used to identify the logical storage volume in accordance with the SCSI (small computer system interface) protocol.

The host 102 may be a tangible server computer with memory, storage and processors, or a virtual host associated with a virtual machine or container running on a tangible server computer. The host 102 operates a host application 132 that utilizes storage services provided by the storage array 100. For example, the host application 132 utilizes the production volume 134 which is presented to the host 102 by the storage array 100. There may be any number of host applications running on the host. Examples of host applications include but are not limited to a database, file server and block server. Each host includes one or more ports P. The host ports are connected to the network 104, and each host port may be associated with a network path to a particular storage array port associated with an FA 122. Any number of ports may be included and the hosts do not necessarily have access to all of the front end ports and FAs.

The production volume 134 represents an abstraction layer between the tangible data storage devices of the storage bay and the host. From the perspective of the host 102, data resides on the production volume 134, and the production volume is a single device having a set of contiguous LBAs (logical block addresses). However, the data may actually be maintained at non-contiguous addresses on various different tangible storage devices. The storage array maintains metadata 150 indicative of the location of data on the tangible storage devices in the storage bay. In other words, the computing nodes can use the metadata 150 to determine the actual location of data in the storage bay based on an IO reference to the production volume 134. The data being read or written is temporarily placed in cache 120 while being copied between the host application and the storage bay. More particularly, data that is being written is temporarily held in cache and then destaged to storage, and data that is being read is copied from storage to cache in order to be provided to the host.

The tangible data storage devices 126, 128 that provide data storage for the production volume 134 are organized as a SRP (storage resource pool) 136. The SRP 136 includes multiple data devices 138, 140. Different data devices may be associated with different classes of data storage resources. For example, data device 138 may represent an amount of tier 0 storage on some or all SSD resources of the SSDs of storage device group 126 in the storage bay 116, and data device 140 may represent an amount of tier 1 storage on some or all of the HDDs of storage device group 128 in the storage bay. The production volume 134 (or a storage group of multiple production volumes) may be associated with a SLO (service level objective) that indicates demands for quality of service measured by response time to IO access to that production volume. For example, the SLO for production volume 134 may indicate an IO response time of no greater than 5 ms in order to enable the host application 132 to provide a target level of performance or user experience. Failing to satisfy the SLO does not necessarily cause the host application to become non-functional, but user experience may fall below expectations. The performance tier composition of the SRP 136 may be selected to help satisfy the SLO. Further, a storage tiering program 139 may be implemented by the computing nodes to promote relatively active data (recently accessed) to higher performance storage media, e.g. to tier 0 SSD resources of data device 138, and demote relatively inactive data (not recently accessed) to lower performance storage media, e.g. to tier 1 HDDs of data device 140. Further, some or all of the data on data device 140 may be compressed. Promotion and demotion of extents of data between data devices and tiers may occur periodically or continuously as activity levels change.

The production volume 134 and the tangible data storage devices 126, 128 in the storage bay 116 each have a total storage capacity that is organized into various fixed size units of storage capacity for management purposes. A sector may be the smallest unit of storage that a tangible storage device processes, e.g. providing a sector in response to a read or overwriting a sector in response to a write. On a spinning disk HDD a track may correspond to a concentric band on the disk and a sector may be a portion of such a concentric band. 1 sector may be 512 bytes. 1 block may be 8 sectors. 1 track may be 32 sectors. 1 cylinder may be 15 tracks. The host 102 maintains metadata 130 indicating which locations on the production volume 134 are available and which data is already stored at particular locations. The host application 132 requests IOs (input and output operations) with reference to the production volume 134 by specifying locations using one or more of the fixed size units of storage and addresses indicated by the metadata 130, e.g., specifying a track number, sector and address.

In order for the storage array metadata 150 to be manageable, a fixed size "allocation unit" of storage capacity may be used by the computing nodes as a basic unit for processing IOs. For example and without limitation, the computing nodes may read and write from and to the storage bay in fixed size allocation units such as tracks. The size of the allocation units is generally proportional to the manageability of the metadata, but inversely proportional to resource utilization efficiency when retrieving data from persistent storage. While tracks may be referred to as the fundamental allocation units it should be understood that allocation units may be any fixed size that is greater than the smallest unit on a drive and less than the drive in its entirety. Moreover, tracks are not necessarily 128 kb in size.

In certain circumstances it may be advantageous to process IOs in units of a fixed size other than the allocation units. More particularly, IOs may be selectively processed in either allocation units or smaller sub-allocation units. The extra processing overhead incurred by unnecessarily accessing, compressing or decompressing some data in full size allocation units may offset or negate the increase in metadata manageability associated with use of the allocation units. That overhead may be reduced by selectively using smaller sub-allocation units when only part of the associated allocation unit is required by using only those sub-allocation units that contain required data, e.g. accessing, compressing or decompressing only the required sub-allocation units. Data associated with sub-allocation units that match a known pattern may be represented by a hint rather than data (compressed or uncompressed) in storage. The hint may be used to obtain the data from cache, thereby mitigating overhead associated with accessing backend storage. If the data is compressed or to be stored as compressed data then using the hint may also mitigate the need for performing compression/decompression of the corresponding sub-allocation unit. In other words, pattern awareness may be used to mitigate one or more of the amount of data accessed from backend storage, the amount of data compressed/decompressed, the need to access backend storage in order to satisfy IOs, and the need to perform compression/decompression. Allocation units and sub-allocation units in SRP 136 in the illustrated example may include an indication that certain sub-allocation units match a known pattern. In response to a read IO the data may then be generated in cache 120 by processor 118 without accessing storage devices 126, 128 and without decompression. In response to a write IO the data may be destaged from cache by setting the pattern indicator, and without accessing storage devices 126, 128 and without compression. Although pattern awareness will be described in detail below for sub-allocation unit compression domains in tiered storage, it will be understood that pattern awareness is not limited to use with storage tiering and data compression.

Figure 2:
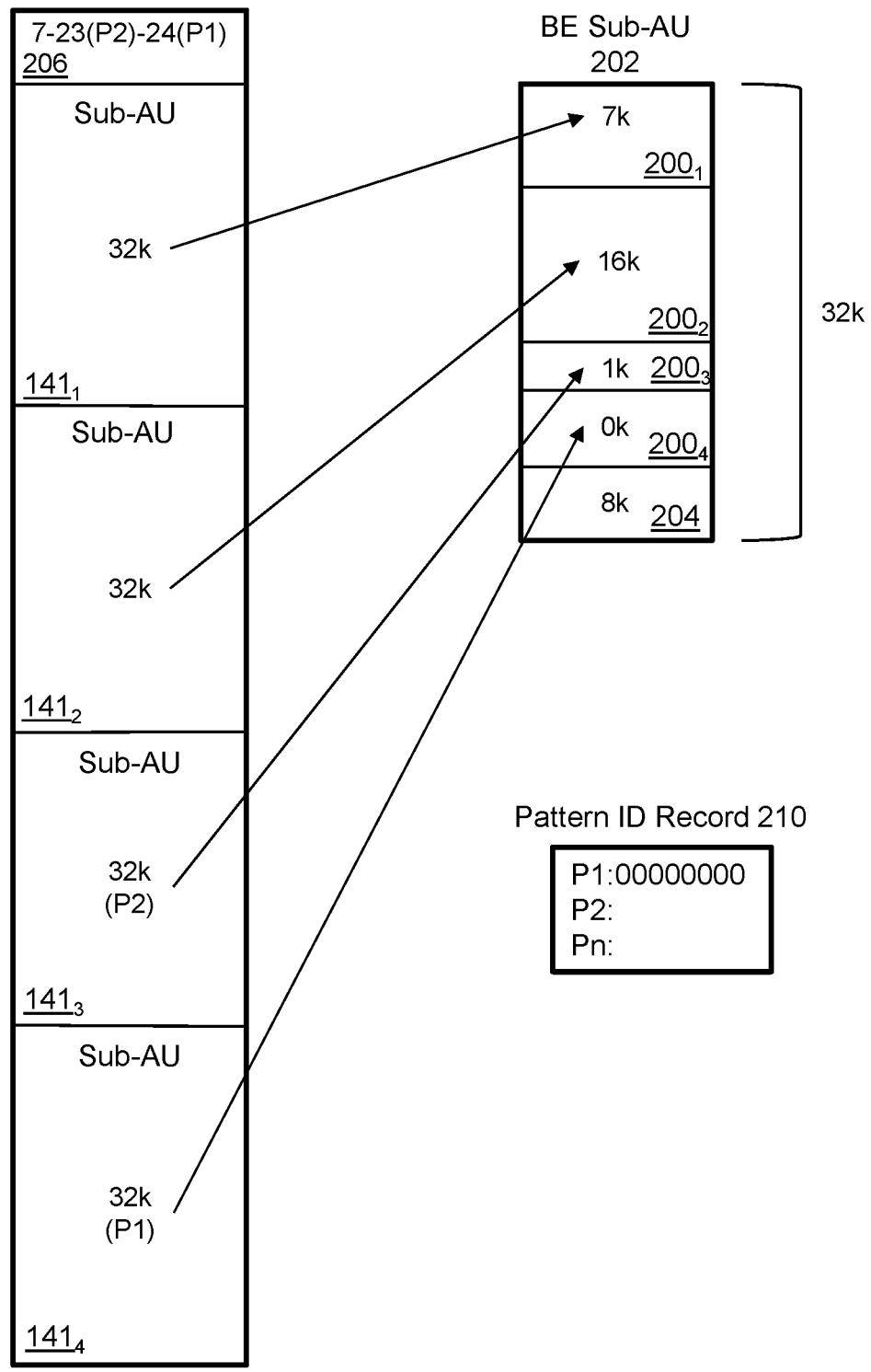
FIG. 2 illustrates an implementation of the pattern-aware sub-allocation units.

Referring now to FIGS. 1 and 2, in some implementations active data may be stored uncompressed and managed in fixed size allocation units while other less active data may be stored in a compressed state and managed in sub-allocation unit compression domains. The sub-allocation units have greater granularity (smaller size) than the allocation units, e.g. and without limitation 32 kb quarter-track sized units of storage. In the illustrated example an allocation unit 135 (on device 138) contains a 128 kb track of uncompressed data of a corresponding 128 kb track in allocation unit 137 (on production volume 134) when the data resides on device 138, e.g. when the data is active. However, the data may be reorganized into multiple compressed sub-allocation units (collectively 200 in FIG. 1, and individually $200_1$-$200_4$ in FIG. 2) when the data resides on device 140, e.g. when the data activity level drops. In order to generate the corresponding compressed sub-allocation units 200 the allocation unit 135 is reorganized into multiple fixed size sub-allocation units $141_1$-$141_4$, each of which is a 32 kb chunk of the 128 kb allocation unit 135. The sub-allocation units may be of a uniform size that is a factor of the size of the allocation unit. The uncompressed 32 kb sub-allocation units $141_1$-$141_4$ may be individually reduced in size by a compression algorithm to yield the respective compressed sub-allocation units $200_1$-$200_4$. The data may be reorganized and moved in either direction between device 138 and device 140 by the tiering program 139, for example and without limitation, as the data becomes more or less active. Consequently, the data may be reorganized into allocation units and sub-allocation units.

Tangible data storage devices 128 may also be organized and managed in terms of sub-allocation units. In the illustrated example a BE (back end) sub-allocation unit 202 has a 32 kb size. Compressed data size values are shown without limitation and strictly to provide context. Sub-allocation unit $141_1$ is compressed from 32 kb to 7 kb, yielding compressed sub-allocation unit $200_1$. Sub-allocation unit $141_2$ is compressed from 32 kb to 16 kb, yielding compressed sub-allocation unit $200_2$. Sub-allocation unit $141_3$ is compressed from 32 kb to 1 kb, yielding compressed sub-allocation unit $200_3$. Sub-allocation unit $141_4$ occupies 0 kb of compressed sub-allocation unit $200_4$. Because BE sub-allocation unit 202 is 32 kb in size, an 8 kb pad 204 of available space remains.

A hint field 206 in allocation unit 135 includes location hints, e.g. "7," "23," and "24," that indicate where each compressed sub-allocation unit associated with the sub-allocation units of allocation unit 135 resides within the corresponding BE sub-allocation unit 202. For example and without limitation, the location hints could include offsets or pointers into the BE sub-allocation unit 202. In the illustrated example the location hints "7," "23," and "24" are offsets into the BE sub-allocation unit indicating that compressed sub-allocation unit $200_2$ is offset 7 k into BE sub-allocation unit 202, compressed sub-allocation unit $200_3$ is offset 23 k (7+16=23) and compressed sub-allocation unit $200_4$ is offset 24 k (7+16+1=24). Compressed sub-allocation unit $200_1$ has no offset (i.e. 0 offset) and thus no corresponding location hint, although a 0 value could be implemented. Each individual compressed sub-allocation unit may be found on the basis of the corresponding location hint. Consequently, individual compressed sub-allocation units may be compressed or decompressed without necessarily decompressing or compressing other compressed sub-allocation units in the same BE sub-allocation unit. As will be further described below, this may provide resource savings in terms of compression/decompression overhead. The location hints may be maintained in various locations, of which allocation units 135, 137, compressed sub-allocation units 200, and BE sub-allocation unit 202 are examples.

The hint field 206 may also include pattern ID ("identifier") hints, e.g. P1, P2 . . . Pn, that indicate whether individual sub-allocation units of allocation unit 135 contain a known data pattern. For example and without limitation, the pattern ID hints could include references to any number of commonly occurring bit patterns in the dataset maintained by the storage array. In the illustrated example the pattern ID hint "P1" associated with location hint "24" indicates a pattern of all 0 bit values in sub-allocation unit $141_4$ and the pattern ID hint "P2" associated with location hint "23" indicates some other known pattern in sub-allocation unit $141_3$. A pattern ID hint may mitigate or obviate the need to access storage devices of the storage bay and perform compression and decompression in order to access a compressed sub-allocation unit to respond to a read IO or a write IO. Further, the occurrence of a known pattern may mitigate or obviate the need for the corresponding compressed sub-allocation unit to require space on storage device 128. For example, the pattern ID hint P1 associated with sub-allocation unit $141_4$ may be used in place of the data in the corresponding compressed sub-allocation unit $200_4$, thereby providing additional pad space for other data. However, as shown for example by pattern hint P2, associated with sub-allocation unit $141_3$ and corresponding compressed sub-allocation unit $200_4$, the compressed sub-allocation unit may contain data that may or may not be a compressed version of the pattern on storage device 128.

A pattern ID record 210 may be maintained to bind specific known patterns with specific pattern ID hints. For example, the pattern ID record could be in metadata 150 and be present in cache 120. The likelihood of different patterns occurring commonly within a dataset or array may be a function of configuration settings, type of host applications supported and various other factors. The pattern ID record may be re-configurable and user-configurable so that the most commonly occurring patterns can be entered in the pattern record for a given system and updated.

Figure 3:
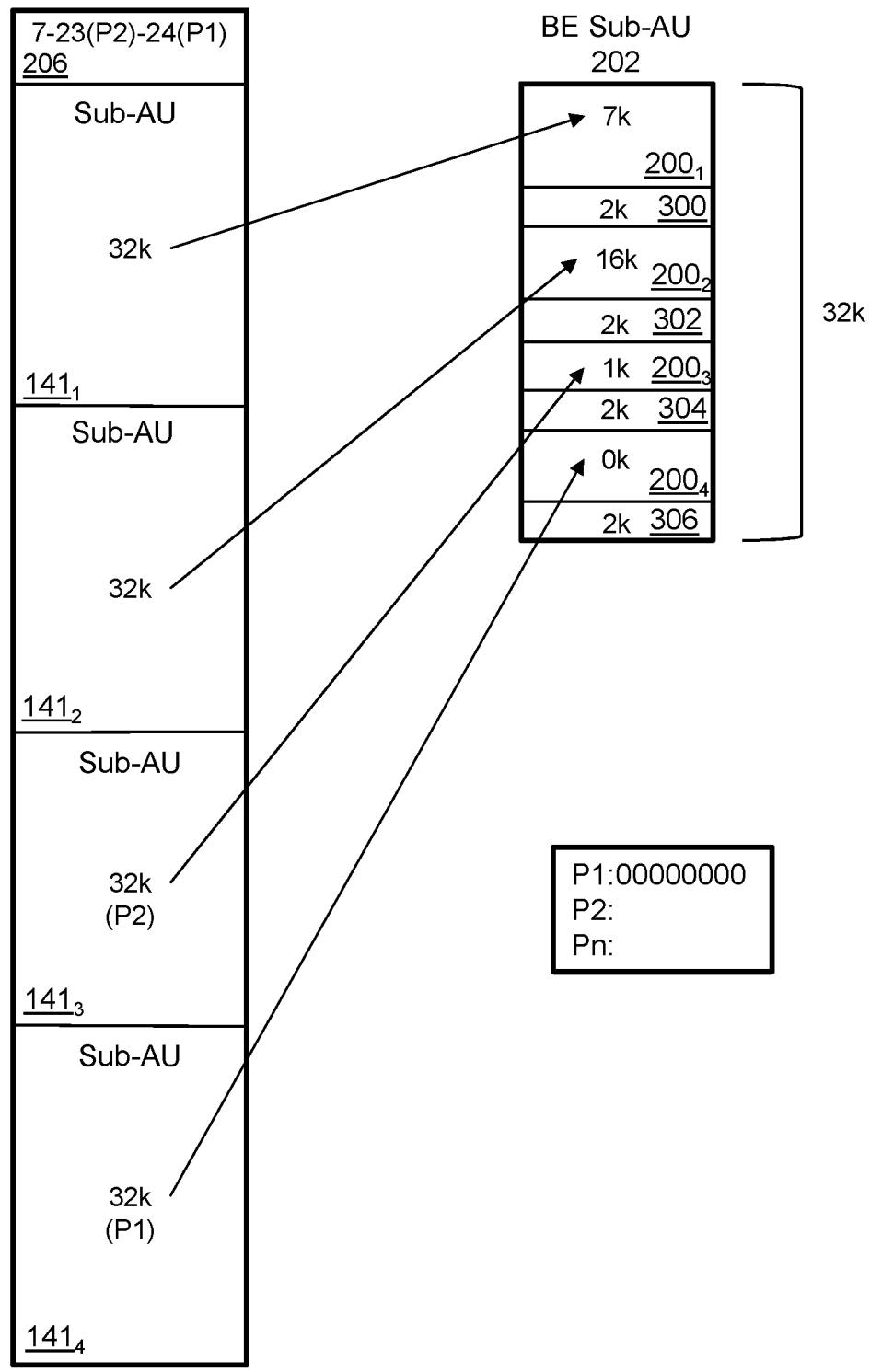
FIG. 3 illustrates another implementation of the pattern-aware sub-allocation units.

FIG. 3 illustrates another implementation of the compression domains. In this implementation the available pad space that remains in the BE sub-allocation unit 202 is distributed. For example, multiple pads may be evenly or proportionally distributed among the compressed sub-allocations. In the illustrated example there are four 2 k pads 300, 302, 304, 306 rather than the single 8 k pad 204 shown in FIG. 2. A wide variety of pad sizing and placement techniques could be implemented.

Figure 4:
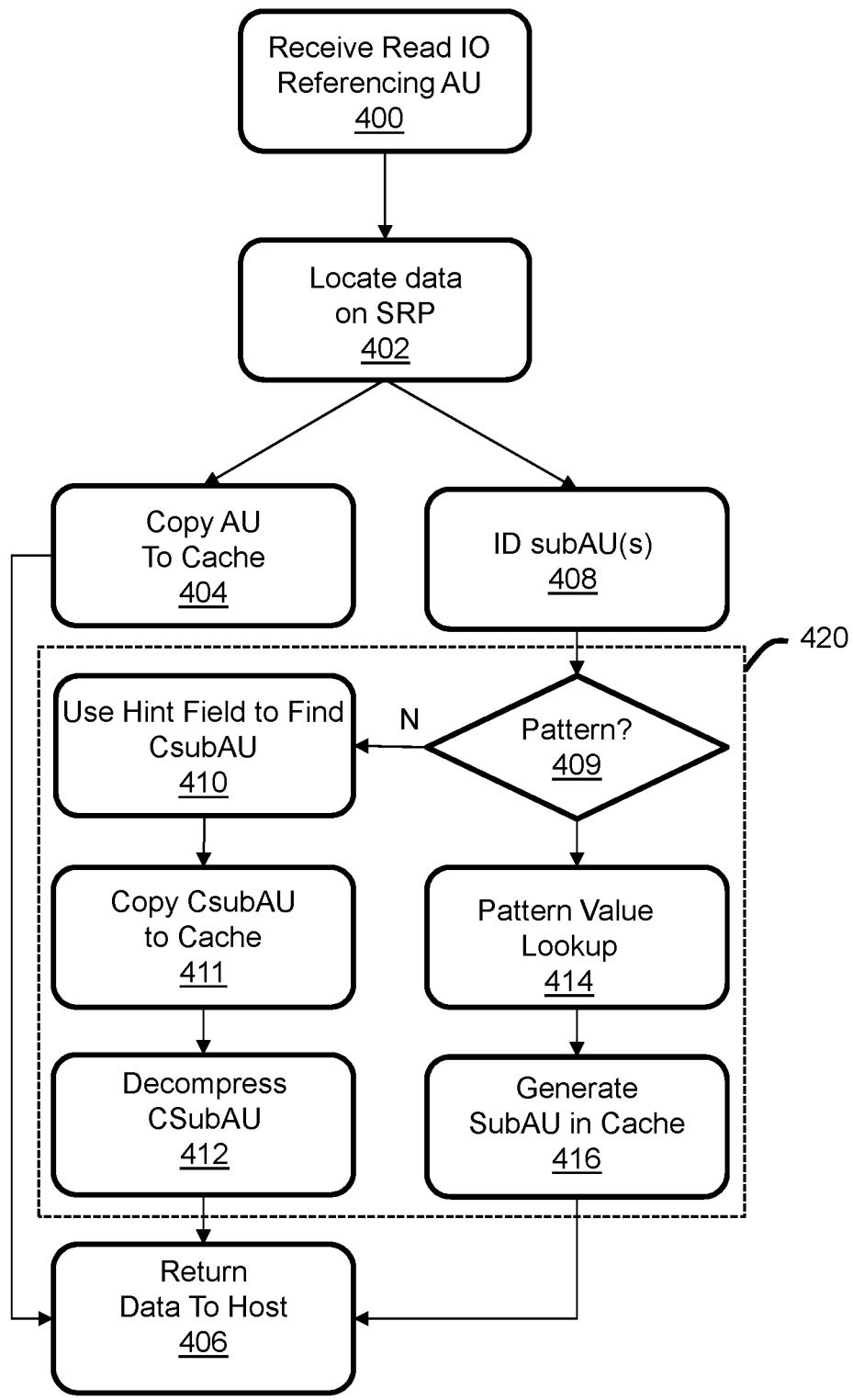
FIG. 4 illustrates a method for the storage array to perform a read of data from pattern-aware sub-allocation units.

An exemplary read will now be described with reference to FIGS. 1, 2 and 4. In order to read data from the storage array the host application 132 uses metadata 130 to create IO 133 as a read request. The read request may identify the target data by referencing allocation unit 137 on the production volume 134, e.g. by specifying one or more of the address, sector, track number and cylinder. The storage array receives the read request as indicated at block 400. In response to receipt of the read request one of the computing nodes $114_1$ locates the corresponding data on SRP 136 as shown in block 402. If the corresponding data is uncompressed, e.g. resident in uncompressed allocation unit 135 on storage device 138, then the computing node copies the allocation unit 135 from the storage bay, e.g. from storage device 126, to the cache 120 as shown in block 404. For purposes of explanation it is assumed that the data being accessed is not already resident in the cache when the read request is received, i.e. it is assumed that a "cache miss" occurs. The requested data, which may comprise only a portion of allocation unit 135, is then returned to the host as indicated in block 406. If the corresponding data is compressed, e.g. resident in the group of sub-allocation units $141_1$-$141_4$ on device 140, then the computing node uses the information in the read request to identify the specific sub-allocation units required to service the read as shown in block 408. For example, address and sector information may be used to identify the specific sub-allocation units. A procedure 420 is implemented for each of the sub-allocation units identified in block 408. At block 409 it is determined whether a pattern ID hint is associated with the sub-allocation unit. The presence of an associated pattern ID hint may be detected by examining the hint field 206. If there is no pattern ID hint associated with the sub-allocation unit then the location hint in the hint field 206 is used to find the corresponding compressed sub-allocation unit (or units) that contain the requested data as indicated in block 410. For example, the offset value 7 in hint field 206 shows the location of compressed sub-allocation unit $200_2$ corresponding to sub-allocation unit $141_2$. The identified compressed sub-allocation unit is copied to the cache as indicated in block 411. The compressed copy in cache is decompressed as indicated in block 412. If, in the alternative, it is determined at block 409 that a pattern ID is associated with the sub-allocation unit then a procedure, e.g. and without limitation a lookup, is performed to determine the pattern value as indicated in block 414. For example, the pattern ID hint P2 can be used as an index into pattern ID record 210 in order to retrieve the corresponding data pattern. The data pattern, i.e. the apparent data contents of sub-allocation unit $141_3$, is then generated in cache 120 by processor 118 without accessing the storage bay, e.g. without copying from storage device 128 to cache, and without performing decompression, as indicated in block 416. The requested data, which may be less than the entire sub-allocation unit, is then returned to the host as indicated in block 406.

Procedure 420 may, but is not required to, provide performance improvement. The overhead associated with fetching compressed data from tangible storage device 128 and then decompressing that compressed data may be avoided for sub-allocation units for which a pattern ID hint is present because the data pattern can be generated in the cache 120 by the processor 118. Thus, the response time for reading a sub-allocation unit having a known pattern may be closer to a cache hit than a cache miss even though the situation is technically a cache miss with reference to compressed data at a lower performance tier of storage. Furthermore, even a partial read of less than the entire track from storage device 128 may provide savings of CPU and cache resources because the non-required compressed sub-allocation units are not necessarily copied to cache from storage and decompressed. In context, a partial read of less than the entire track may correspond to data that is entirely available from sub-allocation unit $141_2$ so it may not be necessary to retrieve sub-allocation units $141_1$, $141_3$, $141_4$ because the required data can be obtained by copying the compressed sub-allocation unit $200_2$ to cache and decompressing only that compressed sub-allocation unit in order to obtain the corresponding sub-allocation unit. If the data is entirely available from sub-allocation unit $141_3$ or $141_4$ then the pattern ID hint can be used to avoid both reading the compressed sub-allocation unit from storage device 128 and decompression of the compressed sub-allocation unit. Consequently, from zero to three quarter tracks may be decompressed rather than an entire track.

Figure 5:
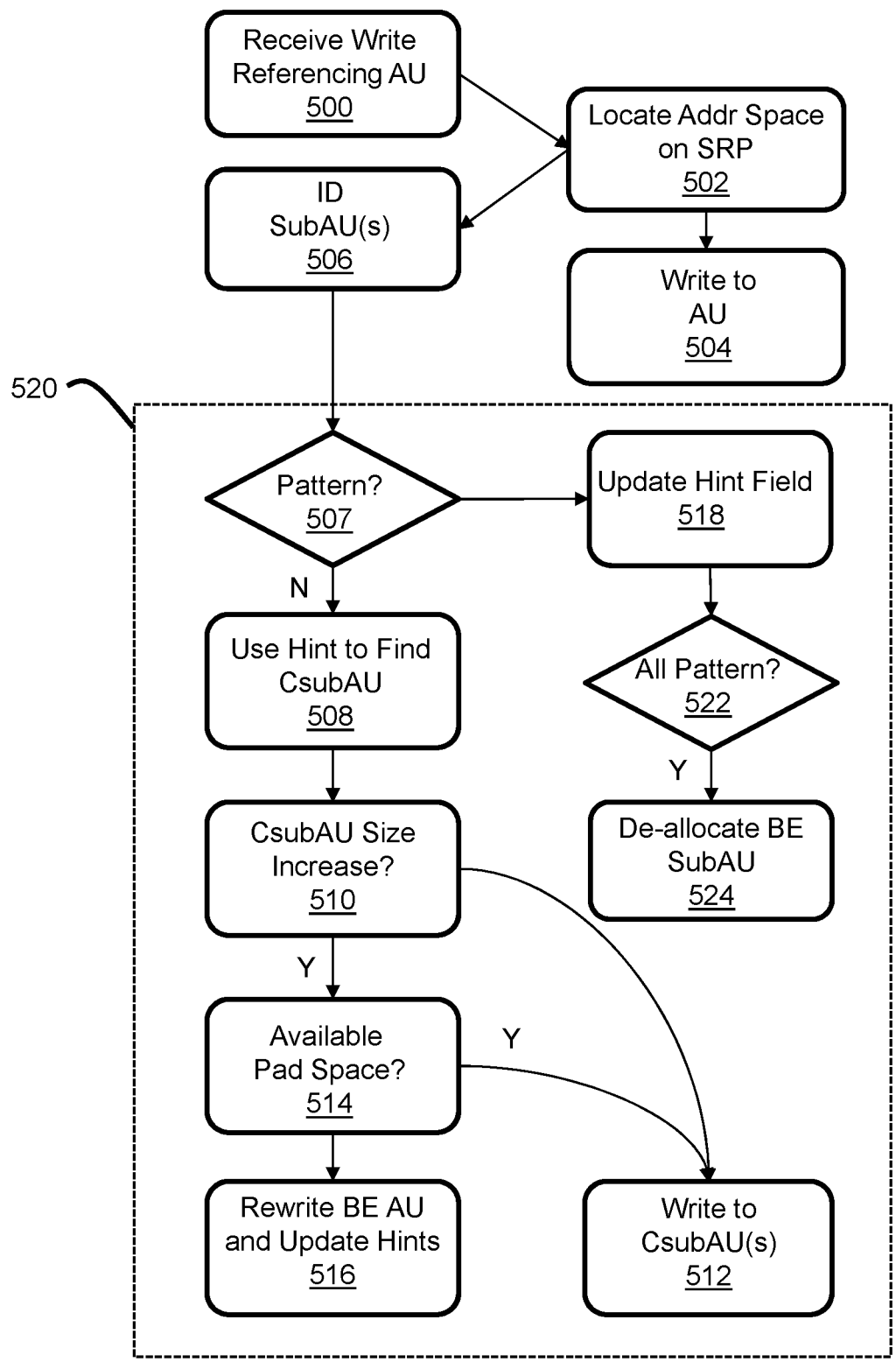
FIG. 5 illustrates a method for the storage array to perform a write to pattern-aware sub-allocation units.

An exemplary write will now be described with reference to FIGS. 1, 2 and 5. In order to write data to the storage array the host application 132 uses the metadata 130 to create IO 133 as a write request. The write request may include data and identify the target allocation unit 137 on the production volume 134, e.g. by specifying one or more of the address, sector, and track number and cylinder. The storage array receives the write request as indicated at 500. In response to receipt of the write request one of the computing nodes $114_1$ locates or allocates corresponding address space on SRP 136 as shown in block 502. If the corresponding address space is uncompressed allocation unit 135 on device 138 then the computing node writes the data to that allocation unit as indicated in block 504. For example, the data may be written to the cache and subsequently destaged to the storage bay. If the corresponding address space is the group of sub-allocation units 200 ($141_1$-$141_4$) on device 140 then the computing node uses the information (e.g. address and sector) in the write request to identify the specific sub-allocation units required to service the write as shown in block 506. For example, a partial write may correspond to data being written only to sub-allocation unit $141_2$ so it may not be necessary to modify the other sub-allocation units $141_1$, $141_3$, $141_4$. A procedure 520 is implemented for each of the sub-allocation units identified in block 506. At block 507 it is determined whether the sub-allocation unit is a known pattern in the pattern ID record. If the data of the sub-allocation unit to be written does not match a known pattern then the location hint in the hint field 206 is used to find the corresponding compressed sub-allocation unit that contains the address space as indicated in block 508. The data being written is then compressed and compared with the corresponding compressed sub-allocation unit to determine whether there is a size increase as indicated in block 510. In other words, it is determined whether the data being written to the sub-allocation unit will fit (compressed) within the currently allocated space. If there is no size increase then the compressed data (i.e. the compressed version of the data being written) is written to the corresponding compressed sub-allocation unit as indicated in block 512. If there is an increase in size then a determination is made as to whether there is available contiguous pad space to accommodate the size increase as indicated in block 514. If there is enough available contiguous pad space to accommodate the size increase then the compressed data (i.e. the compressed version of the data being written) is written to the corresponding compressed sub-allocation unit as indicated in block 512 and some or all of the pad space is utilized. If there is not enough available contiguous pad space to accommodate the size increase then the BE sub-allocation unit is rewritten and the hints are updated as indicated in block 516 and explained in greater detail below. If a pattern match is identified at block 507 then the hints are updated as indicated at block 518. For example, the pattern ID hint associated with the identified pattern may be added to the hint field to indicate that the sub-allocation unit contents are the identified pattern. However, the data is not compressed and written to the storage bay. Rather, after the pattern ID hint is added to the hint field the data may be flushed from cache. Optionally, the location hint for the sub-allocation unit may be updated and other compressed sub-allocation units moved in order to convert the corresponding compressed sub-allocation unit space into available pad space. If all of the sub-allocation units match known patterns as determined in block 522, e.g. as indicated by the existence of a pattern ID hint for each sub-allocation unit, then the storage space occupied by the BE sub-allocation unit may be de-allocated and made generally available as free space as indicated in block 524.

Figure 6:
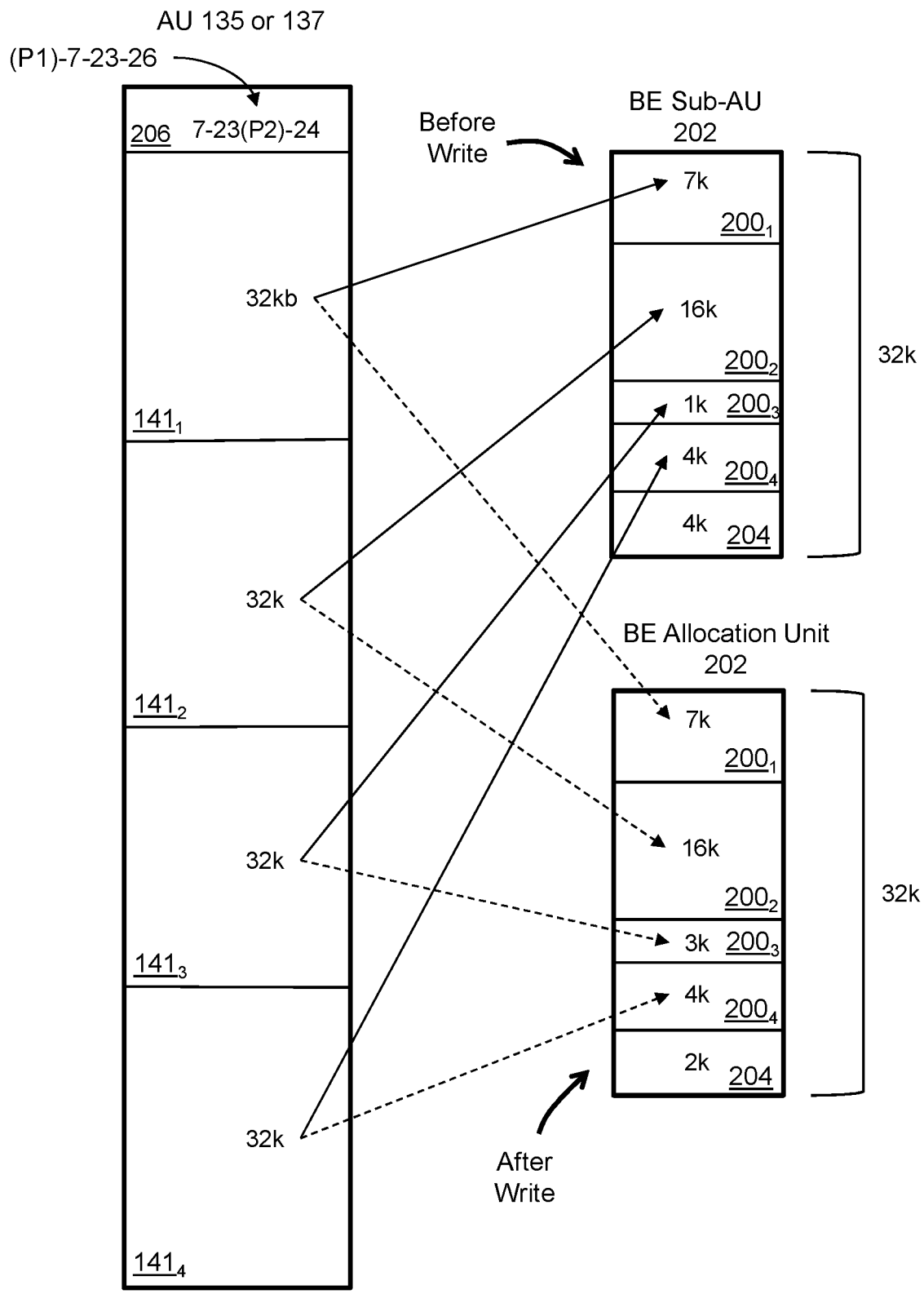
FIG. 6 illustrates an implementation of a write to the pattern-aware sub-allocation units where the size of the compressed data increases.

FIG. 6 illustrates an example of an allocation unit 135 or 137 and corresponding BE sub-allocation unit 202 before and after a write. Initially, as indicated by hints 7-23(P2)-24, sub-allocation unit $141_3$ matches a known pattern with the pattern ID P2. Writes are made to sub-allocation units $141_1$ and $141_3$. The write to sub-allocation unit $141_1$ matches a known pattern with the pattern ID P1. The write to sub-allocation unit $141_3$ does not match a known pattern. The writes do not change data in the other sub-allocation units $141_2$, $141_4$. The write to sub-allocation unit $141_1$ may be implemented by updating the hint field 206 by adding the pattern ID P1 in the zero offset position to indicate that the apparent contents of sub-allocation unit $141_1$ match the P1 pattern. The actual contents of corresponding compressed sub-allocation unit $200_1$ may be left intact in order to avoid the overhead associated with data compression and a write to storage. As a result of the write to sub-allocation unit $141_3$ the size of compressed sub-allocation unit $200_3$ is increased from 1 k to 3 k. Because the written data does not match a known pattern, the pattern ID hint associated with offset location hint "23" in the hint field 206 is updated by removing the existing pattern ID hint P2. Because there is no contiguous pad space to accommodate the size increase a portion of the address space that was allocated to compressed sub-allocation unit $200_4$ is utilized. Compressed sub-allocation unit $200_4$ is rewritten using 2 k of the contiguous pad space 204. The remaining pad space 204 is 2 k in size after the write. Consequently, the offset to compressed sub-allocation unit $200_4$ is updated from 24 to 26. The updated hints (P1)-7-23-26 replace existing hints 7-23 (P2)-24 in the hint field 206.

Figure 7:
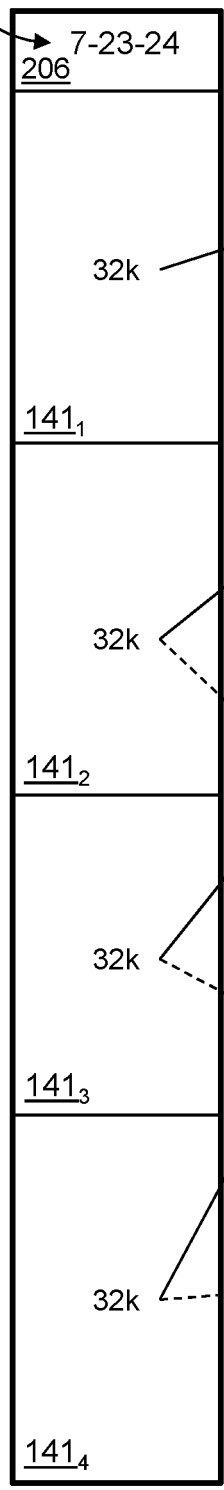
FIG. 7 illustrates another implementation of a write to the pattern-aware sub-allocation units where the size of the compressed data increases.
Figure 7:
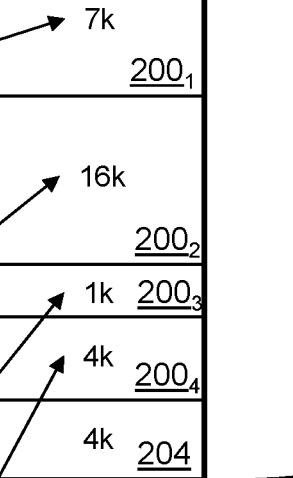
Figure 7:
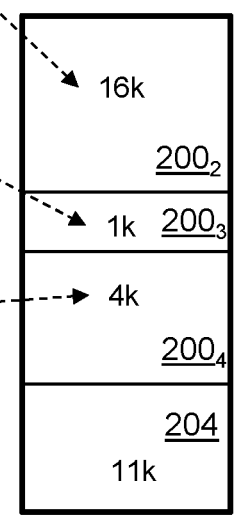

FIG. 7 illustrates another example of the allocation unit 135 or 137 and BE sub-allocation unit 202 before and after a write. A write is made to sub-allocation unit $141_1$. The data being written matches a known pattern associated with pattern ID P1. The write does not change data in the other sub-allocation units $141_2$, $141_3$, $141_4$. The write to sub-allocation unit $141_1$ may be implemented by updating the hint field by adding the pattern ID P1 in the zero offset position to indicate that the apparent contents of sub-allocation unit $141_1$ match the pattern. Moreover, the corresponding 7 k of space that was allocated to compressed sub-allocation unit $200_1$ is converted to pad space 204 by moving (rewriting) compressed sub-allocation units $200_2$, $200_3$, $200_4$ so that 11 k of pad space 204 exists after the write, i.e. (4 k+7 k) exists at offset 21 k. The location hints and pattern hints in the hint field are updated accordingly such that updated hints (P1)-0-16-17 replace existing hints 7-23-24. Even though both sub-allocation unit $141_1$ and sub-allocation unit $141_2$ both have a zero offset, the pattern ID P1 in the hint field prevents compressed data from being read from storage in response to a read of sub-allocation unit $141_1$, and prevents the compressed sub-allocation unit $200_2$ from being overwritten in response to a write of non-pattern data to sub-allocation unit $141_1$. The absence of a pattern ID hint associated with sub-allocation unit $141_2$ prompts the compressed data to be read from storage in response to a read. In the case of a write of non-pattern data to sub-allocation unit $141_1$ the compressed sub-allocation units $200_2$, $200_3$, $200_4$ are moved in order to provide available space to write the compressed non-pattern data. Whether to recover (as pad space) the space associated with compressed data that was overwritten by a known pattern at the cost of a write to storage is an implementation detail.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a block-based storage array that presents a logical volume of storage to a host application, the logical volume of storage having contiguous logical block addresses, the storage array comprising:
   a plurality of tangible data storage drives;
   metadata that maps the contiguous logical block addresses to a non-contiguous physical address set on the tangible data storage drives; and
   a computing node comprising a processor and a cache, the computing node using only a single fixed-size allocation unit of storage capacity in commands to read and write uncompressed data from and to the data storage drives, wherein the single fixed-size allocation unit is larger than a smallest size unit of storage capacity that the tangible data storage drives can process, wherein the computing node is responsive to commands from the host application to access logical blocks of the production volume to use the metadata to access corresponding physical addresses of the tangible data storage drives, and wherein the computing node:
   causes a first fixed-size allocation unit of production volume data to be stored on the tangible data storage drives;
   reorganizes the first fixed-size allocation unit into a plurality of same-size sub-allocation units that are smaller in size than the first fixed-size allocation unit and larger than the smallest size unit of storage capacity that the tangible data storage drives can process, each sub-allocation unit being a separate compression domain that defines which data is interdependently compressed and de-compressed;
   determines that a first sub-allocation unit of the plurality of sub-allocation units matches a known pattern;
   represents the first sub-allocation unit with a first pattern identifier;
   determines that a second sub-allocation unit of the plurality of sub-allocation units does not match the known pattern;
   causes the second sub-allocation unit to be stored on the tangible data storage drives; and
   responsive to a read from the host application, generates the first sub-allocation unit in the cache using the pattern identifier without accessing the data storage drives and without decompressing the first sub-allocation unit.

2. The apparatus of claim 1 comprising a hint field associated with the first fixed-size allocation unit, the hint field comprising a first location hint indicative of location of the second sub-allocation unit on the tangible storage drives.

3. The apparatus of claim 2 wherein the hint field further comprises the first pattern identifier.

4. The apparatus of claim 3 wherein the computing node, in response to a request to read the first sub-allocation unit, uses the first pattern identifier to generate the first sub-allocation unit in the cache.

5. The apparatus of claim 4 wherein the first pattern identifier is indicative of all 0 values.

6. The apparatus of claim 1 further comprising a record of a plurality of known patterns, the record being maintained in the cache.

7. The apparatus of claim 6 wherein the computing node, in response to a request to read the first sub-allocation unit, uses the first pattern identifier with the record of known patterns to generate the first sub-allocation unit in the cache.

8. The apparatus of claim 6 wherein the computing node, in response to a request to write to the second sub-allocation unit, determines that the second sub-allocation unit will match one of the known patterns as a result of the write, and represents the second sub-allocation unit with a second pattern identifier.

9. The apparatus of claim 1 wherein the computing node, in response to a request to write to the second sub-allocation unit, determines that the second sub-allocation unit will match the known pattern as a result of the write, and represents the second sub-allocation unit with the first pattern identifier.

10. The apparatus of claim 9 wherein the computing node determines that all of the sub-allocation units are represented by pattern identifiers and, in response, de-allocates space on the tangible storage drives allocated to the allocation unit.

11. A method comprising:
   with a block-based storage array comprising a plurality of tangible data storage drives and a computing node comprising a processor and a cache, wherein the computing node uses only a single fixed-size allocation unit of storage capacity in commands to read and write uncompressed data from and to the data storage drives, wherein the single fixed-size allocation unit is larger than a smallest size unit of storage capacity that the tangible data storage drives can process:
   presenting a production volume to a host application, the production volume having contiguous logical block addresses mapped by metadata to a non-contiguous physical address set on the tangible data storage drives;
   responsive to commands from a host application, accessing blocks of the production volume by using the metadata to access corresponding physical addresses of the tangible data storage drives;
   causing a first fixed-size allocation unit of production volume data to be stored on the tangible data storage drives;

reorganizing the first fixed-size allocation unit into a plurality of same-size sub-allocation units that are smaller in size than the first fixed-size allocation unit and larger than the smallest size unit of storage capacity that the tangible data storage drives can process, each sub-allocation unit being a separate compression domain that defines which data is interdependently compressed and de-compressed;

determining that a first sub-allocation unit of the plurality of sub-allocation units matches a known pattern;

representing the first sub-allocation unit with a first pattern identifier;

determining that a second sub-allocation unit of the plurality of sub-allocation units does not match the known pattern;

causing the second sub-allocation unit to be stored on the tangible data storage drives; and responsive to a read, generating the first sub-allocation unit in the cache using the pattern identifier without accessing the data storage drives and without decompressing the first sub-allocation unit.

12. The method of claim 11 comprising associating a hint field with the first fixed-size allocation unit, the hint field comprising a first location hint indicative of location of the second sub-allocation unit on the tangible storage drives.

13. The method of claim 12 comprising adding the first pattern identifier to the hint field.

14. The method of claim 13 comprising the computing node, in response to a request to read the first sub-allocation unit, using the first pattern identifier to generate the first sub-allocation unit in the cache.

15. The method of claim 14 comprising interpreting the first pattern identifier as indicative of all 0 values.

16. The method of claim 11 further comprising maintaining a record of a plurality of known patterns, the record being maintained in the cache.

17. The method of claim 16 comprising the computing node, in response to a request to read the first sub-allocation unit, using the first pattern identifier with the record of known patterns to generate the first sub-allocation unit in the cache.

18. The method of claim 16 comprising the computing node, in response to a request to write to the second sub-allocation unit, determining that the second sub-allocation unit will match one of the known patterns as a result of the write, and representing the second sub-allocation unit with a second pattern identifier.

19. The method of claim 11 comprising the computing node, in response to a request to write to the second sub-allocation unit, determining that the second sub-allocation unit will match the known pattern as a result of the write, and representing the second sub-allocation unit with the first pattern identifier.

20. The method of claim 19 comprising the computing node determining that all of the sub-allocation units are represented by pattern identifiers and, in response, de-allocating space on the tangible storage drives allocated to the allocation unit.

* * * * *